United States Patent

Bommer et al.

[11] Patent Number: 5,926,906
[45] Date of Patent: Jul. 27, 1999

[54] WIND DEFLECTOR FOR A WIPER BLADE OF A WINDSHIELD WIPER DEVICE

[75] Inventors: Jurgen Bommer, Tamm; Siegfried Waible, Flein; Eckhardt Schmid, Brackenheim, all of Germany

[73] Assignee: ITT Automotive Europe, GmbH, Frankfurt am Main, Germany

[21] Appl. No.: 08/727,585

[22] PCT Filed: Apr. 21, 1995

[86] PCT No.: PCT/EP95/01511

§ 371 Date: Dec. 19, 1996

§ 102(e) Date: Dec. 19, 1996

[87] PCT Pub. No.: WO95/29826

PCT Pub. Date: Nov. 9, 1995

[30] Foreign Application Priority Data

Apr. 29, 1994 [DE] Germany ............................ 44 15 065

[51] Int. Cl.[6] .................................................. B60S 1/38
[52] U.S. Cl. .................................... 15/250.201; 15/257.01
[58] Field of Search ........................ 15/250.201, 250.361, 15/250.44, 250.351, 250.48, 257.01

[56] References Cited

U.S. PATENT DOCUMENTS 5,647,088   7/1997   Bommer et al. .................. 15/250.201

FOREIGN PATENT DOCUMENTS

| 398376 | 11/1990 | European Pat. Off. . |
| 4017078 | 11/1991 | Germany . |
| 6-234353 | 8/1994 | Japan . |
| 2272831 | 6/1994 | United Kingdom .............. 15/250.201 |
| 2278270 | 11/1994 | United Kingdom . |

*Primary Examiner*—Gary K. Graham
*Attorney, Agent, or Firm*—Plevy & Associates

[57] ABSTRACT

The invention relates to a wind deflector for fastening to the main bracket of a wiper blade with openings in its spine, whereby fastening is accomplished with first fastening sections for screwing and additional second fastening sections for locking at the side wall of the main bracket that is in front in the direction of travel. Second fastening sections are in each case made from two surfaces that face one another a short distance apart and are connected to one another at the upper edge, one surface of which has a catching projection at the lower edge which can engage under the lower edge of the side wall of the main bracket. To increase the strength or stability of second fastening section or the connection of wind deflector and the wiper blade, one of the two walls of fastening section is wider, at least at its lower edge, than the other and in each case has a catching projection in the laterally projecting areas.

20 Claims, 3 Drawing Sheets

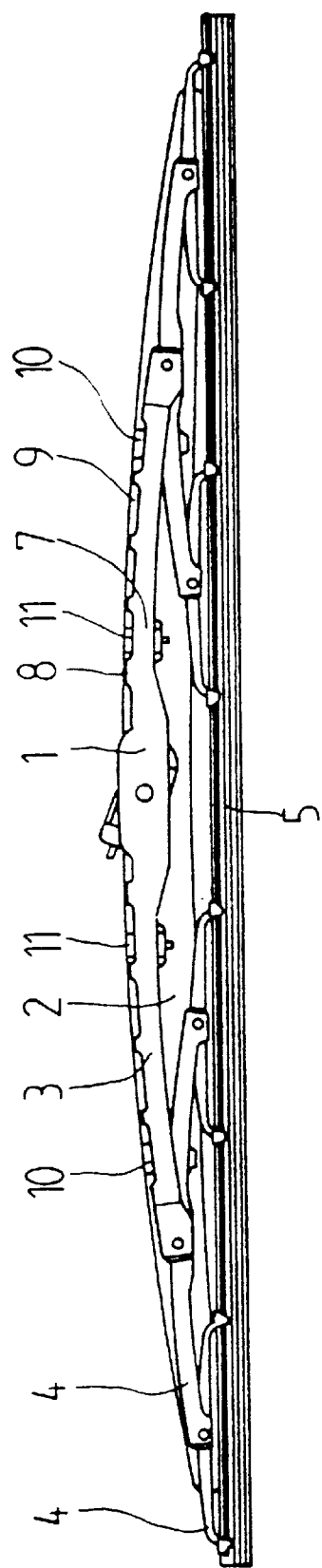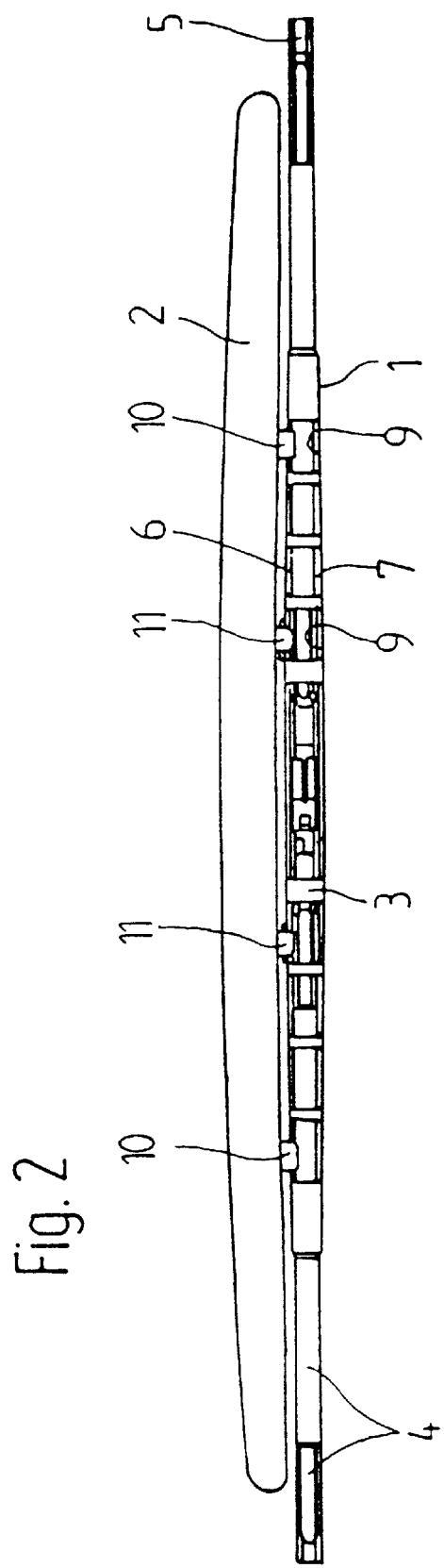

WIND DEFLECTOR FOR A WIPER BLADE OF A WINDSHIELD WIPER DEVICE

FIELD OF THE INVENTION

The invention relates to a wind deflector for a wiper blade of a windshield cleaning device, especially for motor vehicles, and more particularly to a wind deflector which attaches to the main bracket of a wiper blade with multiple fastening sections.

BACKGROUND OF THE INVENTION

Wind deflectors for attachment to the main bracket of a wiper blade are already known.

EP 0 398 376 A1 shows a wind deflector that can be fastened to the main bracket of a wiper blade with a total of two fastening sections. The main bracket is designed to be essentially u-shaped in cross-section and has a spine from which two side walls extend downward in the direction of the windshield that is to be cleaned. In the spine of the main bracket are openings that do not directly reach to the side walls. The fastening of the wind deflector is accomplished with each of the two fastening sections in the area of one of the openings in the spine of the main bracket, whereby the fastening sections are mounted from above on the spine of the main bracket. One of the fastening sections is designed so that a protruding section of it engages from behind with the edge of the opening in the main bracket spine. The second fastening section lies above on the edge of an opening, and a molded part is inserted from below into the main bracket, whereby the portions of the fastening section and the molded part that are arranged on both sides of the opening are screwed together by means of a fastening screw.

In the case of such a fastening, the possibility exists that under the action of the corresponding force from the stream of air that hits the wind deflector, the wind deflector may move relative to the main bracket. As a result, the flow conditions may be unintentionally affected negatively. In contrast, it may be that the fastening of the unscrewed fastening section may release unintentionally. In addition, fastening with only two fastening points for extended wind deflectors does not appear to be appropriate. In the case of EP 0 398 376 A1, the wind deflector is shorter than the main bracket and thus considerably shorter than the supporting frame of the wiper blade. As a result, the increase that can be achieved in the force with which the wiper blade is pressed against the windshield is correspondingly small. In addition, the installation of the wind deflector on the wiper blade is somewhat expensive since the wind deflector as well as the molded part and the fastening screw must be handled individually at the same time, whereby they have to be brought into the installation position and then held in place until final installation.

From EP 0 433 169 A1, another wind deflector is known that is manufactured from plastic for a wiper blade with a main bracket that is essentially u-shaped in cross-section. This wind deflector, which is somewhat longer than the main bracket but considerably shorter than the supporting frame of the wiper blade, is to be fastened to the main bracket with two relatively narrow fastening sections. To this end, the two fastening sections are matched in cross-section in like fashion to the cross-section of the main bracket and provided on both U-legs with catching projections which in each case can engage under a lower edge of a side wall of the main bracket. This wind deflector is thus fastened in an advantageously simple manner by just locking onto the main bracket on the wiper blade. A defect in turn consists in that the wind deflector may move on the wiper blade or else there may be an unintentional release of one or both catch connections. It is also clear to one skilled in the art that, owing to considerations of materials processing or machine-tool engineering, the production of the inward-facing catching projections on the U-legs of the fastening sections requires that in each case a slot-like opening be made in the spine of each fastening section. In the corresponding form tool, an additional slide that can make these openings in the spine of the fastening section must be used in each case for the undercuts of the catching projection. These openings in turn greatly weaken the basic cross-section of the spine of the fastening section, so that the risk of rupture exists at this point when there is stress. The necessary stability and strength of the combination of wind deflector and wiper blade cannot be ensured.

The object of the invention is to further develop a wind deflector of the type mentioned above, in such a way that both in the initial installation and in the retrofitting of suitable wiper blades, sufficient strength or stability both of the fastening section of the wind deflector and of the combination of wind deflector and wiper blade is ensured.

SUMMARY OF THE INVENTION

According to the invention, the object is achieved by a wind deflector for a wiper blade of a windshield wiper device, especially for motor vehicles, which is screwed to a side wall of a main bracket, which is essentially u-shaped in cross-section, of a wiper blade that is in front in the direction of travel with a corresponding first fastening section, according to which, in addition to the first fastening sections for screwing on the main bracket of the wiper blade, the wind deflector also has additional second fastening sections for locking on the side wall of the main bracket that is in front in the direction of travel. In this case, the second fastening sections of two walls that are arranged some distance apart are formed, which are connected to one another at their top side by a spine. The distance between the two walls is matched to the thickness of the side wall of the main bracket of the wiper blade that is in front, and the two walls thus form a slot that opens downward. At least one of the two walls can be deflected in a springy manner, and at least one of the two walls has a catching projection at its lower edge which can engage under the lower edge of the side wall of the main bracket.

An essential idea of the invention now consists in avoiding the opening in the spine which connects the two walls of the second fastening section. This is achieved in that, at least at its lower edge, one of the two walls of the second fastening section is wider than the other wall and in that in each case a catching projection is present only in the laterally projecting areas of the wider wall. In this case, it basically does not matter whether the wall that is right next to or right at the wind deflector is wider and whether the wall that is further from the wind deflector is narrower or vice versa. These measures make it possible to produce the second fastening sections without cross-section-reducing slot-shaped openings in the spine that connects the two walls. The production of the wind deflector is simplified, and the strength of the fastening sections and thus the reliability of the connection between wind deflector and wiper blade are increased.

To install the wind deflector according to the invention on the wiper blade, the wind deflector with its two fastening sections is locked from above in the area of the corresponding openings in the spine of the main bracket on the side wall of the main bracket that is in front in the direction of travel. The wind deflector is thus already held in the installation position on the wiper blade by the catch connection. The screw connection with the first fastening sections can now be produced in a simple way.

If the wind deflector is intended to be installed on a wiper blade in which very little space is available between the side wall of the main bracket and a subordinate bracket of the supporting frame that is arranged between the side walls of the main bracket, a design of the second fastening section is advisable. Since the wall, which can be deflected in a springy manner and which must be inserted between the side wall of the main bracket and a subordinate bracket during installation, does not have the catching projection, a fairly narrow gap is sufficient for this wall.

It is further advantageous if in principle the wider wall of the second fastening section is wider only where it is necessary, namely at the lower edge, since the catching projections are to be arranged there in the widened sections. It has turned out to be optimum, to design the wider wall in a trapezoidal shape that widens downward, whereby the upper narrow side has the same width as the other wall that is designed rectangular as a whole.

Facilitation of the locking of the second fastening section to the side wall of the main bracket can be achieved in that, both the catching projection at the one wall and the lower edge of the other wall of the second fastening section have inclined impact surfaces that face inward into the slot.

Economical production is also achieved by having the wind deflector, including the second fastening section, be produced in one piece from plastic.

To ensure problem-free fastening of the wind deflector even on wiper blades that are not equipped with special fastening means for interaction with the first fastening sections for a screw connection, a separate, profiled clamping element is part of each wind deflector with each fastening section. This clamping element is to be arranged between the fastening screw and a corresponding surface of the first fastening section and positively and/or negatively engages from behind with the lower edge of the side wall of the main bracket of the wiper blade after the installation of the wind deflector. This configuration is especially advantageous for retrofitting of suitable, already available wiper blades.

Especially if there is not much space between the inside of the main bracket and a subordinate wiper blade bracket that is arranged in the cross-section of the main bracket or is recessed in this cross-section, the clamping element should be made of spring steel. To ensure fail-safe fastening of the wind deflector on the main bracket and to provide for specific adaptation of tolerances, it is advisable that, the angle that the two sections of the clamping element that are bent toward one another form be slightly less than 90°. Reliable bracing of the first fastening section against the main bracket is achieved by the thus-produced springy system of the section of the clamping element that engages from behind with the side wall of the main bracket that is in front. Since, in contrast, the side wall of the main bracket that is in front is not as high as the support surface of the first fastening section, an area is recessed from the section of the clamping element which engages from behind with the side wall that is in front at the corresponding point and is curved in the direction toward the wind deflector. When the wind deflector is installed, this curved area engages with the lower edge of the side wall of the main bracket that is in front. To ensure further adaptation of tolerances relative to the height of the side wall of the main bracket that is in front, an advantageous configuration of the clamping element is proposed.

Since a relatively long wind deflector that is made of plastic is available with a certain elasticity and, under the action of the corresponding force, is subjected to an undesirable elastic shape change owing to the air flow that occurs over its length, it is advantageous to arrange the first and the second fastening sections relative to the length of the wind deflector. This arrangement keeps the elastic deformation of the wind deflector small and ensures good lateral guiding on the wiper blade.

BRIEF DESCRIPTION OF THE DRAWINGS

Below, the invention is explained in more detail in embodiments. Here, in the respective drawings:

FIG. 1 shows a wiper blade with an installed wind deflector (view of the side that is to the rear in the direction of travel), FIG. 2 shows the top view of the wiper blade with wind deflector of FIG. 1 installed.

DETAILED DESCRIPTION OF THE INVENTION

Figure 5:
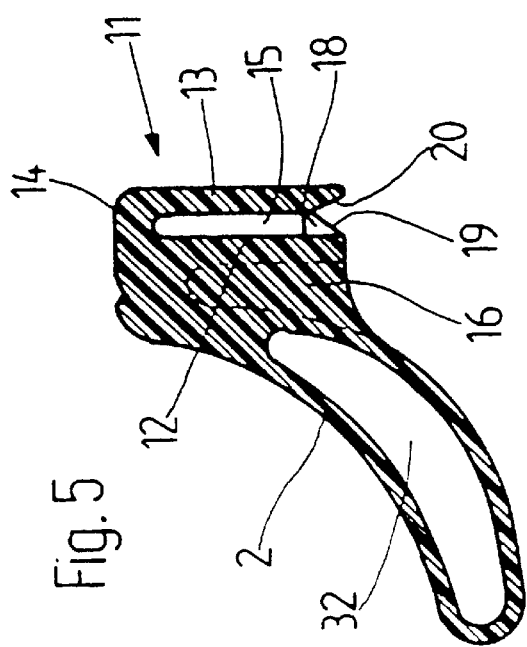
FIG. 5 shows section V—V of FIG. 3 in enlarged view.

Wiper blade 1 that is depicted in FIGS. 1 and 2 with installed wind deflector 2 has a main bracket 3 and several subordinate brackets 4 which form the supporting frame as a whole. This supporting frame supports wiper strip 5 and during the wiping process guides the latter over the windshield of a motor vehicle that is to be cleaned, not shown. Main bracket 4 is essentially u-shaped in cross-section (FIG. 6), whereby two side walls 6, 7 extend from a spine 8 that connects side walls 6, 7 downward in the direction toward the windshield that is to be cleaned, and spine 8 has openings 9 which extend in width as far as side walls 6, 7.

Wind deflector 2 has two first fastening sections 10 to screw on and two second fastening sections 11 to lock on, with which said deflector is fastened in each case in the area of an opening 9 on side wall 6 of main bracket 3 that is in front in the direction of travel. When wind deflector 2 is installed, the latter is advantageously first locked with second fastening sections 11 from above in the area of corresponding openings 9 to side wall 6 that is in front, thus ensuring that first fastening sections 10 are brought into the installation position and held there. The screw connection between first fastening sections 10 and the side walls that are in front is now produced.

FIGS. 1 and 2 also show that wind deflector 2 extends almost over the entire length of the supporting frame and is thus only slightly shorter than the latter. Relative to the lengthwise extension of wind deflector 2, in each case a first fastening section 10 is approximately one fourth of the length of wind deflector 2 from one end of wind deflector 2 and arranged on the latter. Second fastening sections 11 are arranged between two first fastening sections 10, and the distance between two first fastening sections 10 is roughly divided into about three segments of equal length. With this degree of approximation, deviations of up to about a third of the same segment lengths are to be permissible. In this case, the points where individual fastening sections 10, 11 are arranged depend on the geometry of main bracket 3, especially at the sites where there are openings 9 in spine 8 of main bracket 3.

Figure 3:
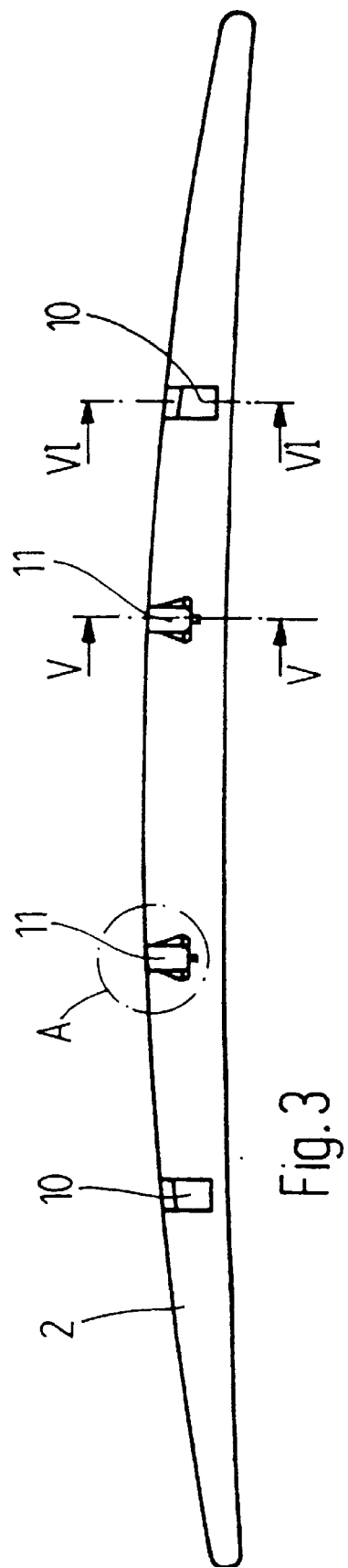
FIG. 3 shows a wind deflector (view of the side that lies to the rear in the direction of travel)

The above-described arrangement of first and second fastening sections 10 and 11 on wind deflector 2 can also easily be seen from FIG. 3. This figure also shows in rough terms that first and second fastening sections 10 and 11 are designed differently.

Figure 4:
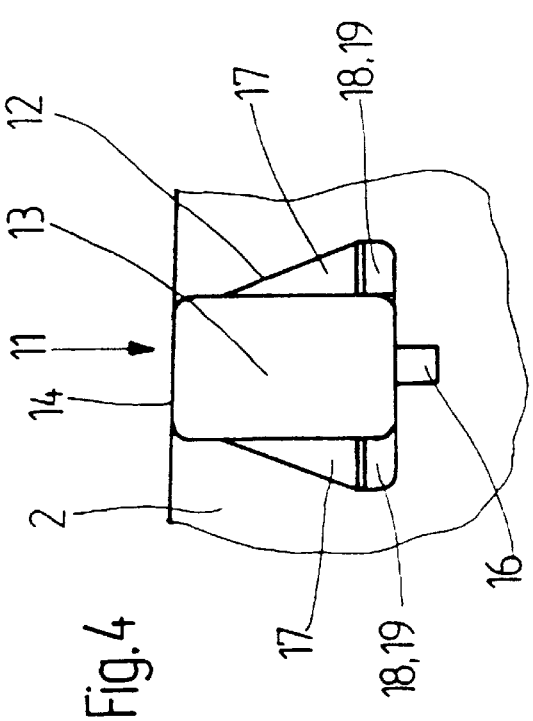
FIG. 4 shows cutaway portion A of FIG. 3 in enlarged view.

FIGS. 4 and 5 show an advantageous design of second fastening section 11 according to the invention. Second fastening sections 11 are structured the same, so that hereinafter only one such fastening section 11 is described. Two walls 12 and 13 are arranged some distance apart, which distance is matched to the thickness of side wall 6 of main bracket 3 that is in front, and are connected to one another at their upper edge by a spine 14, whereby spine 14 is additionally connected to wind deflector 2. Between two walls 12, 13, of which wall 12 is directly at and/or right next to wind deflector 2 and wall 13 is arranged further from wind deflector 2, a slot 15 that opens downward is formed in a certain way. Wall 12 is designed relatively rigidly and connected via an additional stiffening rib 16 to wind deflector 2. In addition, FIG. 4 clearly shows that elastically deflectable wall 13 has a rectangular shape and that wall 12 has a shape that widens downward as a shape that can be called trapezoidal, whereby the width of the upper narrow side corresponds to that of wall 13. Wall 12 thus has areas 17 that project laterally over wall 13 and are the widest at the lower edge. In each case, in laterally projecting areas 17, a catching projection 18 is molded onto the lower edge of wall 12 which, when viewed in cross-section (FIG. 5), projects into slot 15. Catching projections 18 are intended to lock the lower edge of side wall 6 of main bracket 3 that is in front. As already mentioned in the description of advantages, catching projections 18 and the lower edge of wall 13, when viewed in cross-section, have inclined impact surfaces 19 or 20 which extend from behind into slot 15 and which facilitate the locking of second fastening section 11 to side wall 6 of main bracket 3 that is in front.

Figure 8:
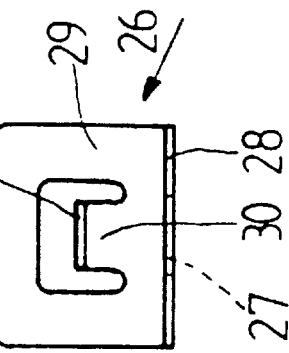
FIG. 7 shows the clamping element of FIG. 6 as a detail in sectional representation and FIG. 8 shows the clamping element of FIG. 7 in side view.
Figure 7:
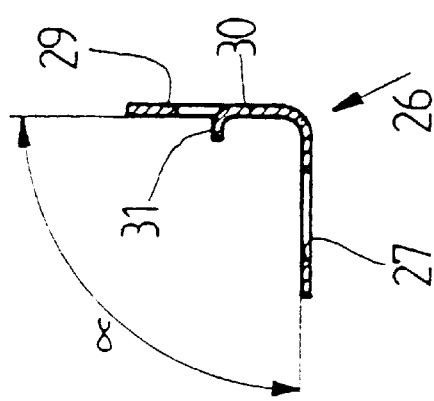
Figure 6:
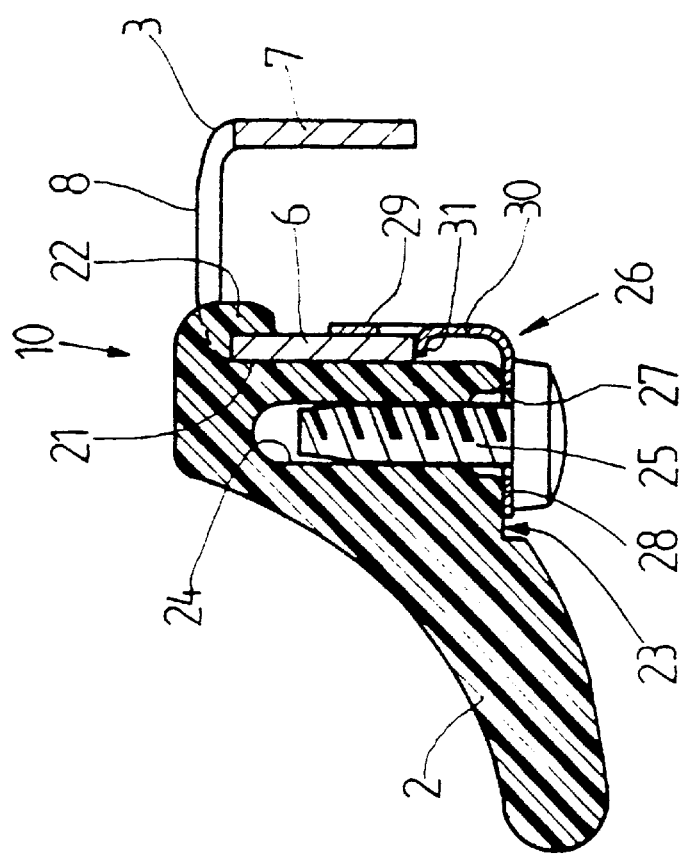
FIG. 6 shows section VI—VI of FIG. 3, supplemented by the main bracket and fastening elements in enlarged view.

FIGS. 6, 7, and 8 show an embodiment for a screw-type fastening of wind deflector 2 with first fastening sections 10, whereby said fastening is also well suited for later retrofitting even in existing wiper blades with wind deflectors 2 according to the invention. Shown fastening section 10 has a support surface 21 which, in the installed state of wind deflector 2, rests outside on side wall 6 of main bracket 3 that is in front. A hook-shaped structure 22, which can engage the upper edge of side wall 6 from above or from behind, is molded onto the upper edge of this support surface 21. At the lower edge of support surface 21, another surface 23, from which a screw opening 24 in the form of a blind hole for a fastening screw 25 extends into fastening section 10, extends crosswise to said support surface in the direction toward wind deflector 2. This screw opening 24 thus runs with its geometric axis parallel to side wall 6.

In this embodiment a separate clamping element 26 made of spring steel is part of wind deflector 2 according to the invention, whereby said clamping element 26 is relatively thin in comparison to side walls 6, 7 of main bracket 3 and is formed essentially from sections 28 and 29 that are bent toward one another. In this case, sections 28 and 29 enclose an angle α, which is slightly less than 90°. Hole 27 for fastening screw 25 is made in section 28 of clamping element 26. From section 29 of clamping element 26, however, a spring tongue 30 is recessed, whose free end is curved as area 31 inward in the direction toward wind deflector 2 and engages under and supports the lower edge of side wall 6 of main bracket 3 in the installed state of wind deflector 2. In this case, area 31 is more narrow by a certain amount than the thickness of side wall 6, i.e., with installed wind deflector 2 area 31 normally does not come to rest on support surface 21 of fastening section 10. As a result, sufficient mobility for spring tongue 30 is achieved with area 31. When clamping element 26 is braced on fastening section 10 and on side wall 6 of main bracket 3, spring tongue 30 with area 31 can be deflected in a springy manner from its released position, with which also certain tolerances can be compensated. In the installed state of wind deflector 2, the other portion of section 29 of clamping element 26 engages from behind with side wall 6 of main bracket 3 that is in front and rests with corresponding prestressing on its inside. Thus, in each case the positive and/or negative connection of wind deflector 2 and wiper blade 1, depicted in FIG. 6, is made possible with first fastening sections 10.

FIG. 5 also shows that the wing-like profile of wind deflector 2 can have a through-going cavity 32 or multiple cavities 32 that are separated from one another, which makes it possible to economize on material and weight.

It will be understood that the embodiments described herein are merely exemplary and that a person skilled in the art may make many variations and modifications to the described embodiments utilizing functionally equivalent elements to those described. Any variations or modifications to the invention described hereinabove are intended to be included within the scope of the invention as defined by the appended claims.

We claim:

1. A wind deflector for a wiper blade of a windshield wiper device, especially for motor vehicles, the wiper blade having a generally elongated, U-shaped main bracket with a first side wall and a second side wall, the first and second side walls coupled together by a spine having openings defined therein, the first side wall disposed in the direction of the wiper blade's travel, said wind deflector comprising:

an elongated deflector body;

first fastening sections disposed on said body for screwing said wind deflector to the first side wall of the wiper blade;

second fastening sections disposed on said body, each of said second fastening sections including a first wall and a second wall, each of said walls having a lower edge, said first and second walls facing one another and forming a downward opening slot, said first and second walls connected to one another at top sides thereof by a spine member, wherein at least one of said first and second walls can be deflected in a springy manner and at least one of said first and second walls including catching projections at said lower edge, to be locked in the area of the openings in the spine of the main bracket at the first side wall, wherein said one of said first and second walls is wider at said lower edge than the other of said first and second walls and includes laterally projecting areas, said laterally projecting areas each defining one of said catching projections which are engagable under a lower edge of the first side wall of the main bracket.

2. The wind deflector according to claim 1, wherein said first wall comprises said at least one of said first and second walls, said first wall being generally rigid and disposed directly adjacent to a wind deflector surface, said second wall comprising said at least one of said first and second walls which can be deflected in a springy manner, said second wall disposed further from said surface of said wind deflector than said first wall.

3. The wind deflector according to claim 2, wherein said first wall defines a trapezoidal shape that widens downward, and said second wall defines a rectangular shape that has a width of a upper narrow trapezoidal side of said first wall.

4. The wind deflector according to claim 1, wherein each of said catching projections includes inclined impact surfaces that are directed inward toward a slot.

5. The wind deflector according to claim 1, wherein said wind deflector is manufactured in one piece from a plastic material.

6. The wind deflector according to claim 1, wherein said first fastening sections each have a support surface to rest on the first side wall of the main bracket, said support surface having an upper edge which defines a hook-shaped structure for positively engaging an upper edge of the first side wall of the main bracket and a lower edge and a crosswise surface that runs crosswise to said lower edge, said crosswise surface having a screw opening for a fastening screw, wherein a separate, profiled clamping element made of spring steel, is provided in each first fastening section to be arranged between said fastening screw and said crosswise surface, and after the installation of said wind deflector to the wiper blade, said clamping element engages from behind with a lower edge of the first side wall of main bracket.

7. The wind deflector according to claim 6, wherein said clamping element is thin relatively to the first side wall of the main bracket, and has sections which are bent toward one another and form an angle that is slightly less than 90°, one of said sections having a hole for receiving said fastening screw therethrough and an area recessed from remaining ones of said sections and is curved in a direction toward said wind deflector, wherein after installation of said wind deflector said area engages under the lower edge of the first side wall of the main bracket.

8. The wind deflector according to claim 7, wherein said clamping element further includes a spring tongue having a curved free end in said direction toward said wind deflector, said spring tongue being recessed from said remaining ones of said sections of said clamping element, said curved free end of said tongue being more narrow than the thickness of the first side wall of the main bracket.

9. The wind deflector according to claim 1, wherein said wind deflector has a length that is slightly shorter than the length of the wiper blade, wherein said first fastening sections are in each disposed approximately one fourth of said length of said wind deflector from an end thereof and wherein said second fastening sections are both disposed between said first fastening sections so that said second fastening sections generally divide a distance defined between said first fastening sections into three portions of approximately equal size.

10. A wind deflector for a wiper blade of a windshield wiper device, the wiper blade having a side wall associated with a spine having openings defined therein, said wind deflector comprising:
an elongated deflector body;
first fastening sections disposed on said body for screwing said wind deflector to the side wall of the wiper blade;
second fastening sections disposed on said body, each of said second fastening sections including a first wall and a second wall, each of said walls having a lower edge, wherein said one of said first and second walls is wider at said lower edge than the other of said first and second walls and includes laterally projecting areas, said laterally projecting areas each defining a catching projection which is engagable under a lower edge of the first side wall of the wiper blade.

11. The wind deflector according to claim 10, wherein said first wall is generally rigid and disposed directly adjacent to a wind deflector surface, and said second wall elastically resilient and can be deflected in a springy manner, said second wall disposed further from said surface of said wind deflector than said first wall.

12. The wind deflector according to claim 11, wherein said first wall defines a trapezoidal shape that widens downward, and said second wall defines a rectangular shape.

13. The wind deflector according to claim 10, wherein each of said catching projections includes inclined impact surfaces that are directed inward toward a slot.

14. The wind deflector according to claim 10, wherein said wind deflector is unitarily fabricated from a plastic material.

15. The wind deflector according to claim 10, wherein said first fastening sections each have a support surface to rest on the first side wall of the wiper blade, said support surface having an upper edge which defines a hook-shaped structure for positively engaging an upper edge of the first side wall of the wiper blade and a lower edge and a crosswise surface that runs crosswise to said lower edge, said crosswise surface having a screw opening for a fastening screw, wherein a separate, profiled clamping element made of spring steel, is provided in each first fastening section to be arranged between said fastening screw and said crosswise surface, and after the installation of said wind deflector to the wiper blade, said clamping element engages from behind with a lower edge of the first side wall of the wiper blade.

16. The wind deflector according to claim 15, wherein said clamping element is thin relatively to the first side wall of the wiper blade, and has sections which are bent toward one another and form an angle that is slightly less than 90°, one of said sections having a hole for receiving said fastening screw therethrough and an area recessed from remaining ones of said sections and is curved in a direction toward said wind deflector, wherein after installation of said wind deflector said area engages under the lower edge of the first side wall of the wiper blade.

17. The wind deflector according to claim 16, wherein said clamping element further includes a spring tongue having a curved free end in said direction toward said wind deflector, said spring tongue being recessed from said remaining ones of said sections of said clamping element, said curved free end of said tongue being more narrow than the thickness of the first side wall of the wiper blade.

18. The wind deflector according to claim 10, wherein said wind deflector has a length that is slightly shorter than the length of the wiper blade, wherein said first fastening sections are in each disposed approximately one fourth of said length of said wind deflector from an end thereof and wherein said second fastening sections are both disposed between said first fastening sections so that said second fastening sections generally divide a distance defined between said first fastening sections into three portions of approximately equal size.

19. A wind deflector for a wiper blade of a windshield wiper device, the wiper blade having a side wall associated with a spine having openings defined therein, said wind deflector comprising:

an elongated deflector body;

a first fastening section disposed on said body for screwing said wind deflector to the side wall of the wiper blade;

a second fastening section disposed on said body, said second fastening section including a first wall and a second wall, each of said walls having a lower edge, wherein said one of said first and second walls is wider at said lower edge than the other of said first and second walls and includes laterally projecting areas, said laterally projecting areas each defining a catching projection which is engagable under a lower edge of the first side wall of the wiper blade.

20. The wind deflector according to claim 19, wherein said first fastening sections includes a support surface to rest on the first side wall of the wiper blade, said support surface having an upper edge which defines a hook-shaped structure for positively engaging an upper edge of the first side wall of the wiper blade and a lower edge and a crosswise surface that runs crosswise to said lower edge, said crosswise surface having a screw opening for a fastening screw, wherein a separate, profiled clamping element made of spring steel, is provided in each first fastening section to be arranged between said fastening screw and said crosswise surface, and after the installation of said wind deflector to the wiper blade, said clamping element engages from behind with a lower edge of the first side wall of the wiper blade.

* * * * *